United States Patent [19]
Bentsen

[11] 3,708,115
[45] Jan. 2, 1973

[54] DIAPHRAGM LOGIC DAY SIGNAL CIRCUIT

[75] Inventor: Louis J. Bentsen, Arlington Heights, Ill.

[73] Assignee: Honeywell, Inc., Minneapolis, Minn.

[22] Filed: July 26, 1971

[21] Appl. No.: 166,140

[52] U.S. Cl. ................................................. 236/47
[51] Int. Cl. ........................................... G05d 23/185
[58] Field of Search ............................... 236/46, 47

[56] References Cited

UNITED STATES PATENTS 3,212,710  10/1965  Nilles ........................... 236/47
3,305,172  2/1967  Duchek ........................ 236/1 C Primary Examiner—Edward J. Michael
Attorney—Lamont B. Koontz et al.

[57] ABSTRACT

A diaphragm logic circuit for use in a day-night, pneumatic, temperature control system, the circuit providing a pressure output signal corresponding to day operation and a pressure output signal for controlling a fan P-E switch or the like, and having means for temporarily establishing day cycle operation when the system is normally in night operation.

10 Claims, 3 Drawing Figures

| MODE | VALVE | | | | | OUTPUT | |
|---|---|---|---|---|---|---|---|
| | 21 | 22 | 23 | 24 | 25 | FAN P-E PILOT | DAY SIGNAL |
| DAY -16 PSI | C | O | C | C | C | ZERO | MLP |
| NIGHT 25-PSI | O | C | O | M | C | BLP | ZERO |
| DCR | O | C | C | C | O | ZERO | MLP |

INVENTOR.
LOUIS J. BENTSEN
BY
ATTORNEY.

3,708,115

DIAPHRAGM LOGIC DAY SIGNAL CIRCUIT

BACKGROUND AND SUMMARY OF THE INVENTION

This invention relates to a pneumatic condition control system and more particularly to a diaphragm logic circuit for use in such a system. Many pneumatic condition control systems have a pressure source capable of providing multiple levels of pressure. One of such levels ordinarily establishes a day mode of operation and another of such levels establishes a night mode. If the condition being controlled is the temperature of a space, the differences between the day and night modes of operation often times relate to temperature control point, the amount of ventilation provided, the fan operation, and so forth. Such pneumatic temperature control systems typically include means for temporarily restoring the day mode of operation when the system is normally in the night mode. This feature is particularly advantageous when, for example, the system is employed in a school building and a particular classroom is to be occupied during the evening at which time the overall system is ordinarily in night operation.

The subject invention comprises a diaphragm logic circuit particularly useful in a control system of the type described. The circuit combines a number of functions to provide a compact and economical control circuit adaptable to a number of different types of control systems. The circuit first provides an output pressure intended for day operation. This pressure signal may be used to control an additional control circuit controlling the operation of a hot water or cold water valve, an electric heat step controller, a steam valve, etc. This signal may also be used to control ventilation. A second function of the circuit is to provide an output which may be used to pilot control means, for example, a fan pressure-to-electric switch. A third function of the circuit is to respond to a particular output of the condition responsive device, for example the thermostat, to temporarily effect day operation of the system when the system would otherwise be in night operation.

The operation of the circuit and further advantages will be appreciated upon reading the detailed description of the invention in view of the drawing.

DETAILED DESCRIPTION OF THE INVENTION

Figures 1, 3:
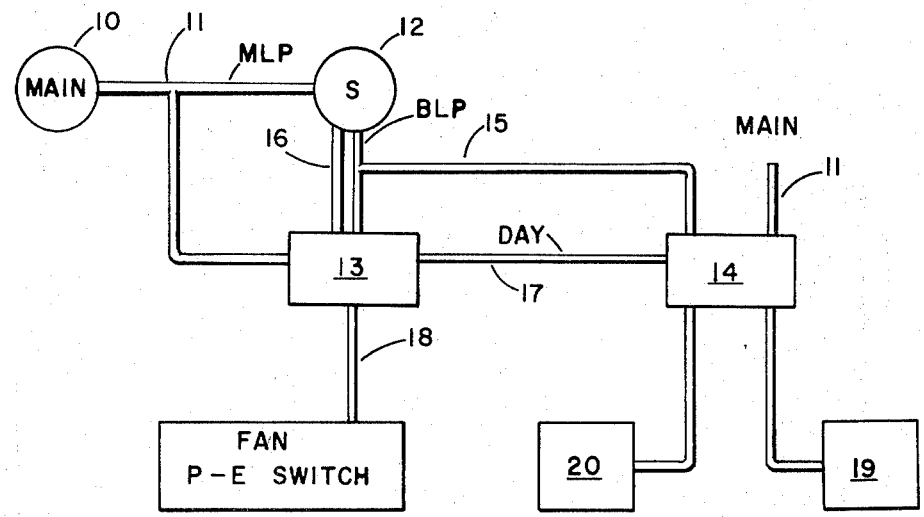
FIG. 1 is a schematic illustration of a pneumatic control system wherein the subject invention may be used.
FIG. 3 is a table showing the positions of the various valves and also the outputs of the circuit during the different modes of operation of the system.

FIG. 1 shows a two level main pressure source 10 connected via main line pressure conduit 11 to a pneumatic thermostat 12, the diaphragm logic day signal circuit 13 and a control circuit 14. The thermostat 12 provides two outputs; the branch line pressure output is communicated via branch line pressure conduit 15 to the circuit 13 and the control circuit 14; the second thermostatic output is a day cycle restoration signal which is communicated via conduit 16 to the circuit 13.

The circuit 13 has two outputs: the first is a pressure signal corresponding to or indicative of day operation which is transmitted through conduit 17 to the control circuit 14; the second is a pilot pressure signal which is communicated through conduit 18 to, for example, a fan pressure-to-electric (P-E) switch.

The control circuit 14, an example of which is disclosed in the co-pending application of the applicant, entitled Diaphragm Logic Control Circuit For Electric Heating System, filed Mar. 11, 1971, Ser. No. 123,290, provides an output to a valve or an electric heat step controller or the like, 19. The circuit 14 may also be connected to an air motion relay or the like 20.

If 19 is an electric heat step controller, the operation of the system of FIG. 1 may be briefly described as follows: during day operation, the circuit 13 causes the fan P-E switch to effect continuous fan operation; the pressure output indicative of day operation transmitted through conduit 17 is equal to main pressure and causes circuit 14 to control the step controller 19 in response to the branch line pressure; if the thermostat 12 calls for additional heat, the control circuit 14 will cause the step controller 19 to provide heating proportionate to the demand for heat as sensed by the thermostat. If this system is in night operation, there will be no output of circuit 13 indicative of day operation so the pressure in conduit 17 will be zero. The pressure output to the fan P-E switch will be equal to branch line pressure so the fan will operate intermittently depending upon the branch line pressure. Because of the absence of pressure in conduit 17, control circuit 14 will function differently. Instead of providing heat proportionate to the branch line pressure, maximum heating will be established if the branch line pressure falls below a predetermined pressure, and zero heating will be established if the branch line pressure exceeds the predetermined value.

Of course, if a different heating medium is used than electric heat, the operation of the system shown in FIG. 1 will be different. However, the circuit 13 remains essentially the same.

Figure 2:
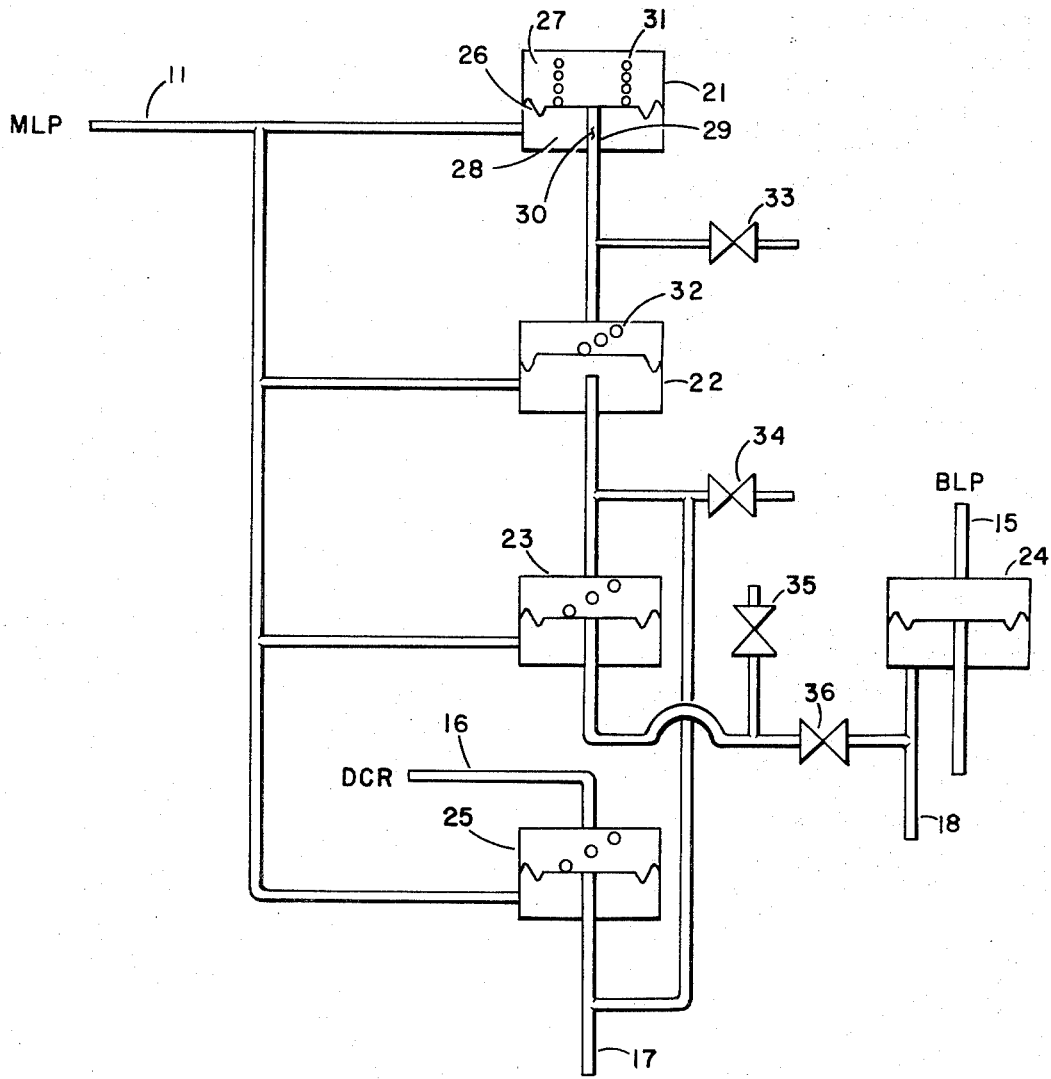
FIG. 2 is a schematic illustration of the inventive diaphragm logic circuit.

FIG. 2 is a schematic illustration of the circuit 13 shown in FIG. 1. The circuit comprises five valve means, 21-25, each comprising a housing divided by a diaphragm 26 into a control chamber 27 and a flow chamber 28. Disposed within the flow chamber 28 is an annular partition means 29 which, sealably cooperating with the diaphragm 26, forms a valving chamber 30.

First valve means 21 has in its control chamber a biasing spring 31. The biasing spring is arranged to hold the first valve means 21 closed when the main pressure is at its first level, for example 16 psi, and is further arranged to allow the first valve means 21 to be open when the main pressure is at its second level, for example 25 psi. Valve means 22, 23, and 25 each preferably have disposed within their respective control chambers light closing springs 32 which ensure that the valve means will be closed when the pressure in the control chamber and flow chambers are equal.

The main pressure source 10 is connected to the flow chambers of each of valve means 21, 22, 23, and 25. Connected to the control chamber of fourth valve means 24 is the branch line pressure output of the thermostat 12. Connected to the control chamber of fifth valve means 25 is the day cycle restoration output signal of the thermostat 12. The valving chamber 30 of first valve means 21 is connected to the control chamber of second valve means 22 and also to a restricted bleed 33. The valving chamber of second valve means 22 is connected to the control chamber of third valve means 23, to a restricted bleed 34, to the valving chamber of fifth valve means 25, and to the day signal output conduit 17. The valving chamber of third valve means 23 is connected to a restricted bleed 35, to the flow chamber of fourth valve means 24, and to the fan P-E pilot output conduit 18. Interposed in the connection between the valving chamber of valve means 23 and the flow chamber of valve means 24 is a restriction 36. The valving chamber of fourth valve means 24 is allowed to communicate with the atmosphere.

The day operation of the circuit 13 may be described as follows. Since the main pressure is at 16 psi during the day, first valve means 21 will remain closed as described above. Accordingly any pressure in the control chamber of second valve means 22 will be bled to atmosphere through restricted bleed 33. The main pressure will therefore cause second valve means 22 to open and main pressure will be transmitted to the day signal output conduit 17. Main pressure will also be transmitted through second valve means 22 to the control chamber of third valve means 23 which will cause, in conjunction with the light closing spring 32, the third valve means 23 to remain closed. Since third valve means 23 is closed, there will be atmospheric pressure in the flow chamber of fourth valve means 24 and accordingly branch line pressure will cause valve means 24 to be closed. The fan P-E pilot pressure output at conduit 18 will accordingly be zero and the fan will run continuously since the P-E switch is arranged to actuate the fan when the pilot pressure is less than approximately 4 psi. Fifth valve means 25 is also closed during day operation since the day cycle restoration pressure signal is equal to main pressure during day operation and accordingly, in conjunction with the light closing spring in the control chamber of the fifth valve means 25, causes fifth valve means 25 to remain closed.

The various valve positions during day operation as well as the fan P-E pilot pressure output and the day signal pressure output are summarized in the table of FIG. 3 as mentioned above.

Night operation of circuit 13 may be described as follows. First valve means 21 is arranged to be open, as described above, when the main pressure is at the night level of 25 psi. Pressure is accordingly transmitted through first valve means 21 to the control chamber of second valve means 22 which results in the closing of second valve means 22. The day cycle restoration pressure signal is, as during the daytime, equal to main pressure during normal night operation. Accordingly fifth valve means 25 will also be closed. Day signal pressure output conduit 17 will accordingly be bled down to zero through restricted bleed 34 and the day signal output pressure will be zero. Likewise the pressure in the control chamber of third valve means 23 will be zero so that main pressure will be transmitted through third valve means 23, through the restriction 36, to the flow chamber of fourth valve means 24. Valve means 24 will act as a pressure reducing valve and will provide an output at conduit 18 substantially equal to the branch line pressure in the control chamber of valve means 24. Thus the position of valve means 24 will be neither open nor closed, but will be modulating as indicated by an "M" in the table of FIG. 3. The positions of the other valves and the outputs of the circuit 13 are again summarized in FIG. 3 for night operation.

When it is desired to temporarily restore day operation while a system is normally in night operation, a mechanism is manually actuated at the thermostat. One type of such mechanism is the subject matter of the copending application of Richard C. Mott et al., entitled Day Cycle Restoration Mechanism, filed June 29, 1971, Ser. No. 158006. When this mechanism is actuated, the day cycle restoration output pressure of the thermostat is reduced from main pressure to a substantially reduced value. The reduced day cycle restoration signal pressure results in fifth valve means 25 opening. Main pressure is thereafter transmitted to the day signal output pressure conduit 17 and also to the control chamber of third valve means 23. Main pressure in the control chamber of valve means 23 causes the third valve means to go closed whereupon the fan P-E pilot pressure signal goes to zero as in the case of day operation. The fan is thereby actuated. A daytime temperature setting is established by means in the thermostat itself and the remainder of the system is caused to control to day operation by virtue of there being a pressure signal indicative of day operation in conduit 17.

Although the subject invention has been described within the context of a temperature control system with particular reference to fan P-E pilot switches, etc., it is intended that the scope of the invention be limited only by the scope of the appended claims.

The embodiments of the invention in which an exclusive property or right is claimed are defined as follows:

1. In a pneumatic condition control system having condition responsive means and a two level pressure source, the first level of pressure for establishing a first mode of operation and the second level of pressure for establishing a second mode of operation, a valve arrangement comprising:

first, second, and third valve means connected to the pressure source;

the first valve means responsive to the second level of pressure to provide an output pressure to close the second valve means;

the second valve means responsive to the first level of pressure to provide an output pressure corresponding to the first mode of operation and to close the third valve means;

the third valve means responsive to the second level of pressure and adapted to be connected to control means.

2. The invention according to claim 1 wherein the first, second, and third valve means each comprises:

housing means;

diaphragm means dividing the housing means into a control chamber and a flow chamber; and, partition means disposed within the flow chamber and arranged to sealably cooperate with the diaphragm means to further define a valving chamber.

3. The invention according to claim 2 further comprising fourth valve means, and wherein the pressure source is connected to the flow chambers of each of the first, second, and third valve means, the valving chamber of the first valve means is connected to the control chamber of the second valve means, the valving chamber of the second valve means is connected to the control chamber of the third valve means, and the valving chamber of the third valve means is connected to the fourth valve means which is responsive to the output of the condition responsive means and adapted to be connected to control means.

4. The invention according to claim 3 further comprising fifth valve means connected to the main pressure source and to the control chamber of the third valve means.

5. The invention according to claim 3 further comprising restricted bleed means connected to the valving chambers of the first, second, and third valve means.

6. In a day-night, pneumatic, temperature control system having a pneumatic thermostat with a branch line pressure output and a day cycle restoration pressure output, and a two level main pressure source, the first level for establishing day operation and the second level for establishing night operation, a diaphragm logic circuit comprising:

first valve means arranged to be open when the main pressure is at the second level and arranged to be biased closed when the main pressure is at the first level;

second and third means;

the first, second, and third valve means each comprising housing means, diaphragm means dividing the housing means into a control chamber and a flow chamber, and partition means located in the flow chamber and arranged to sealably cooperate with the diaphragm means to further define a valving chamber;

the flow chamber of the first, second, and third valve means being connected to the main pressure source, the valving chambers of the first valve means being connected to the control chamber of the second valve means, the valving chamber of the second valve means being connected to the control chamber of the third valve means, the second valve means providing a pressure output corresponding to day operation, the third valve means providing a pressure output adapted to be connected to control means.

7. The invention according to claim 6 further comprising fourth like valve means, the control chamber of the fourth valve means being connected to the branch line pressure output of the pneumatic thermostat, the flow chamber of the fourth valve means being connected to the valving chamber of the third valve means and being adapted to be connected to control means.

8. The invention according to claim 7 further comprising fifth like valve means, the control chamber of the fifth valve means being connected to the day cycle restoration output of the pneumatic thermostat, the flow chamber of the fifth valve means being connected to the main pressure source, and the valving chamber of the fifth valve means being connected to the control chamber of the third valve means.

9. The invention of claim 8 wherein the valving chamber of the first, second, and third valve means are connected to restricted bleed means.

10. The invention according to claim 9 wherein a restriction is interposed in the connection between the valving chamber of the third valve means and the flow chamber of the fourth valve means.

* * * * *